(12) United States Patent
Umeyama

(10) Patent No.: US 8,253,808 B2
(45) Date of Patent: Aug. 28, 2012

(54) IMAGE PROCESSING SYSTEM AND ELECTRONIC CAMERA

(75) Inventor: Kazuya Umeyama, Tokyo (JP)

(73) Assignee: Nikon Corporation, Tokyo (JP)

( * ) Notice: Subject to any disclaimer, the term of this patent is extended or adjusted under 35 U.S.C. 154(b) by 580 days.

(21) Appl. No.: 11/922,131

(22) PCT Filed: Jul. 5, 2006

(86) PCT No.: PCT/JP2006/313388
§ 371 (c)(1),
(2), (4) Date: Dec. 13, 2007

(87) PCT Pub. No.: WO2007/004669
PCT Pub. Date: Jan. 11, 2007

(65) Prior Publication Data
US 2009/0115853 A1 May 7, 2009

(30) Foreign Application Priority Data
Jul. 6, 2005 (JP) .................................. 2005-197830

(51) Int. Cl.
*H04N 5/225* (2006.01)
(52) U.S. Cl. .................................. 348/207.2; 348/231.2
(58) Field of Classification Search ............... 348/207.2, 348/211.1, 211.99, 231.2, 231.3, 231.6, 231.99, 348/333.01
See application file for complete search history.

(56) References Cited

U.S. PATENT DOCUMENTS

| 6,618,553 | B1* | 9/2003 | Shiohara | 386/117 |
| 6,940,541 | B1* | 9/2005 | Small | 348/207.2 |
| 6,952,222 | B2* | 10/2005 | Sekine | 348/207.2 |
| 7,764,393 | B2* | 7/2010 | Yamada et al. | 358/1.15 |
| 2001/0020979 | A1* | 9/2001 | Lathrop | 348/222 |
| 2003/0222985 | A1* | 12/2003 | Goto et al. | 348/207.2 |
| 2003/0227554 | A1* | 12/2003 | Kazami et al. | 348/231.3 |
| 2004/0046873 | A1 | 3/2004 | Kubo et al. | |
| 2004/0095469 | A1* | 5/2004 | Lin | 348/207.2 |
| 2004/0140971 | A1* | 7/2004 | Yamazaki et al. | 345/204 |
| 2005/0007626 | A1* | 1/2005 | Takaiwa | 358/1.15 |
| 2005/0280716 | A1 | 12/2005 | Toyoda | |

FOREIGN PATENT DOCUMENTS

| JP | A-2002-073289 | 3/2002 |
| JP | A-2003-125330 | 4/2003 |
| JP | A-2004-104601 | 4/2004 |
| JP | A-2005-354372 | 12/2005 |
| JP | A-2006-229474 | 8/2006 |

* cited by examiner

*Primary Examiner* — Aung S Moe
*Assistant Examiner* — Chriss Yoder, III
(74) *Attorney, Agent, or Firm* — Oliff & Berridge, PLC

(57) ABSTRACT

The image processing system is an image processing system including an electronic camera and an image output device, in which the electronic camera includes an image pickup unit capturing an object image by an image sensor and outputting raw data of a digital format, a recording unit recording the raw data, a conversion unit reading the raw data from the recording unit to convert the raw data to a data format which can be handled by the image output device, and a transfer unit transferring the converted raw data, and in which the image output device includes a receiving unit receiving the raw data transferred by the transfer unit, an image processing unit performing image processing for output on the raw data, and an image output unit outputting the raw data as an image, thereby shortening the processing time and improving the operability.

8 Claims, 4 Drawing Sheets

[Fig.1]
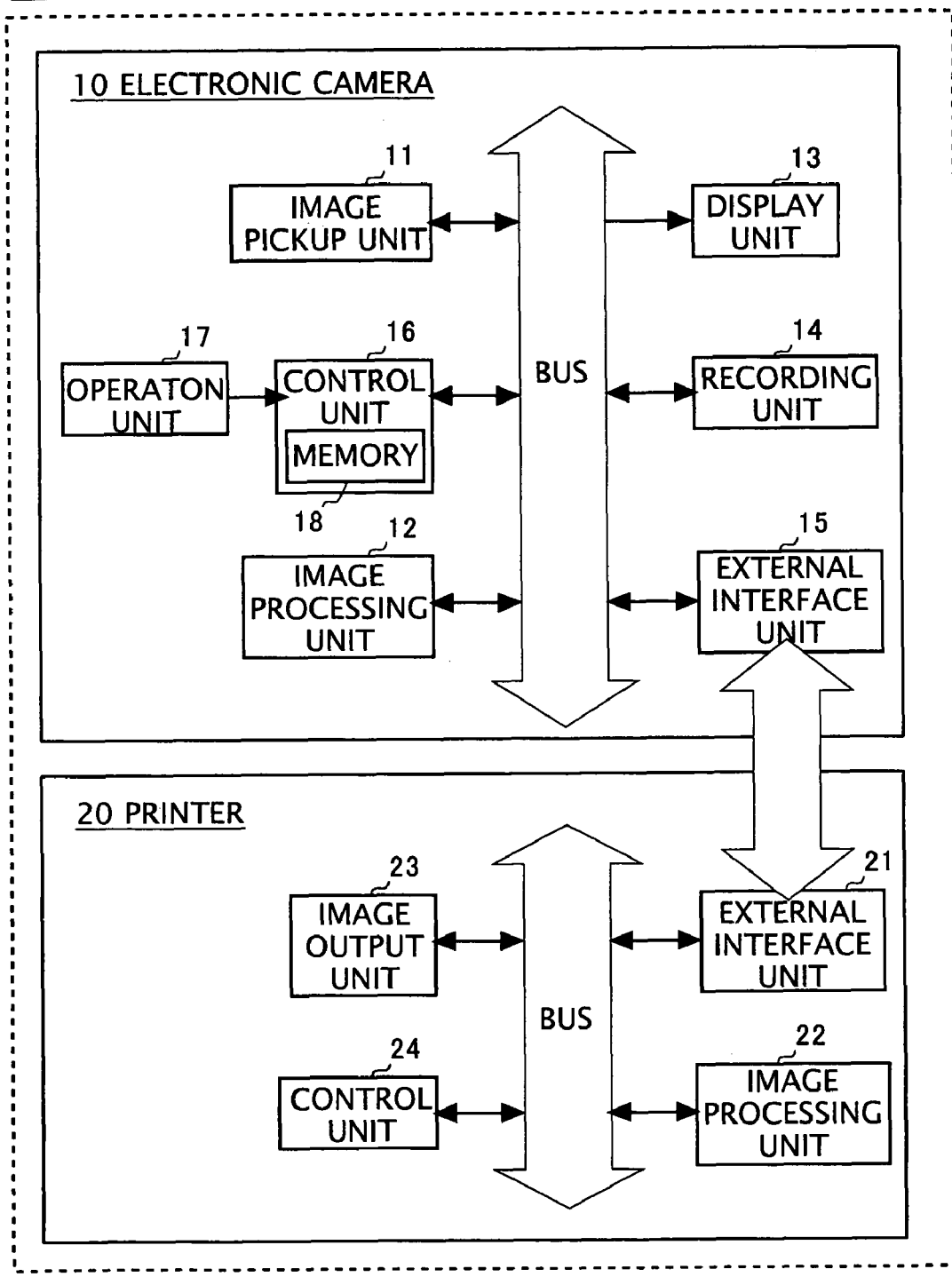

[Fig.2]
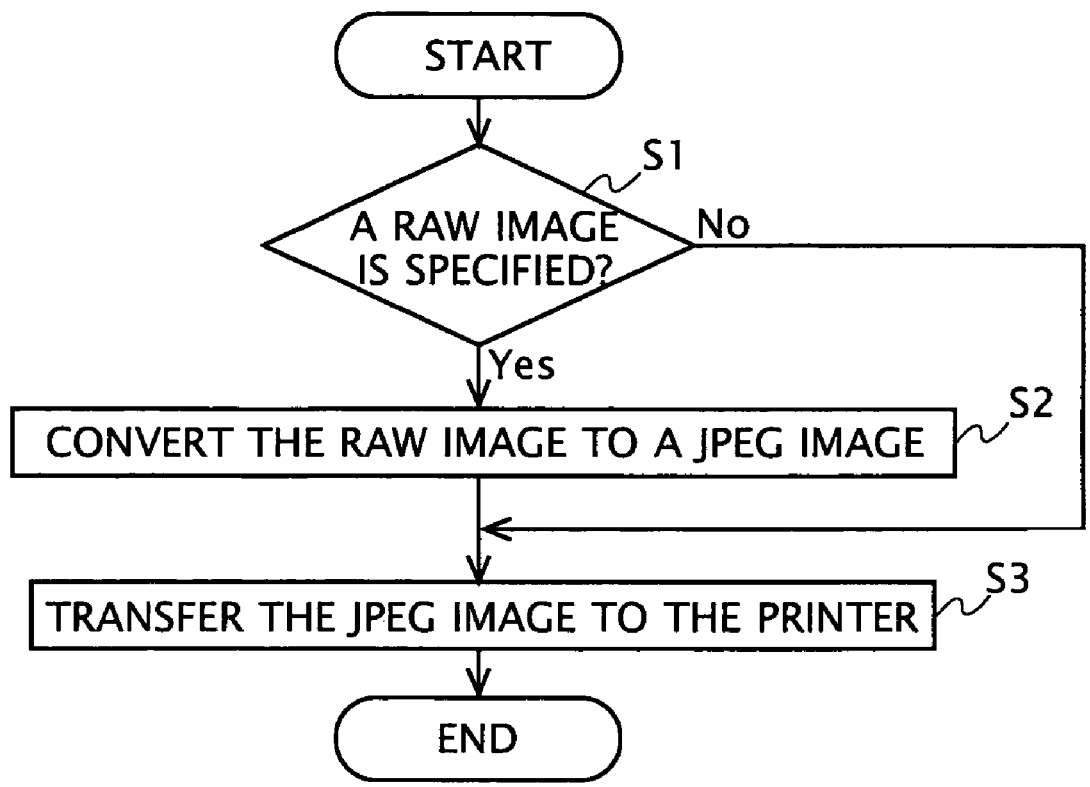

[Fig.3]
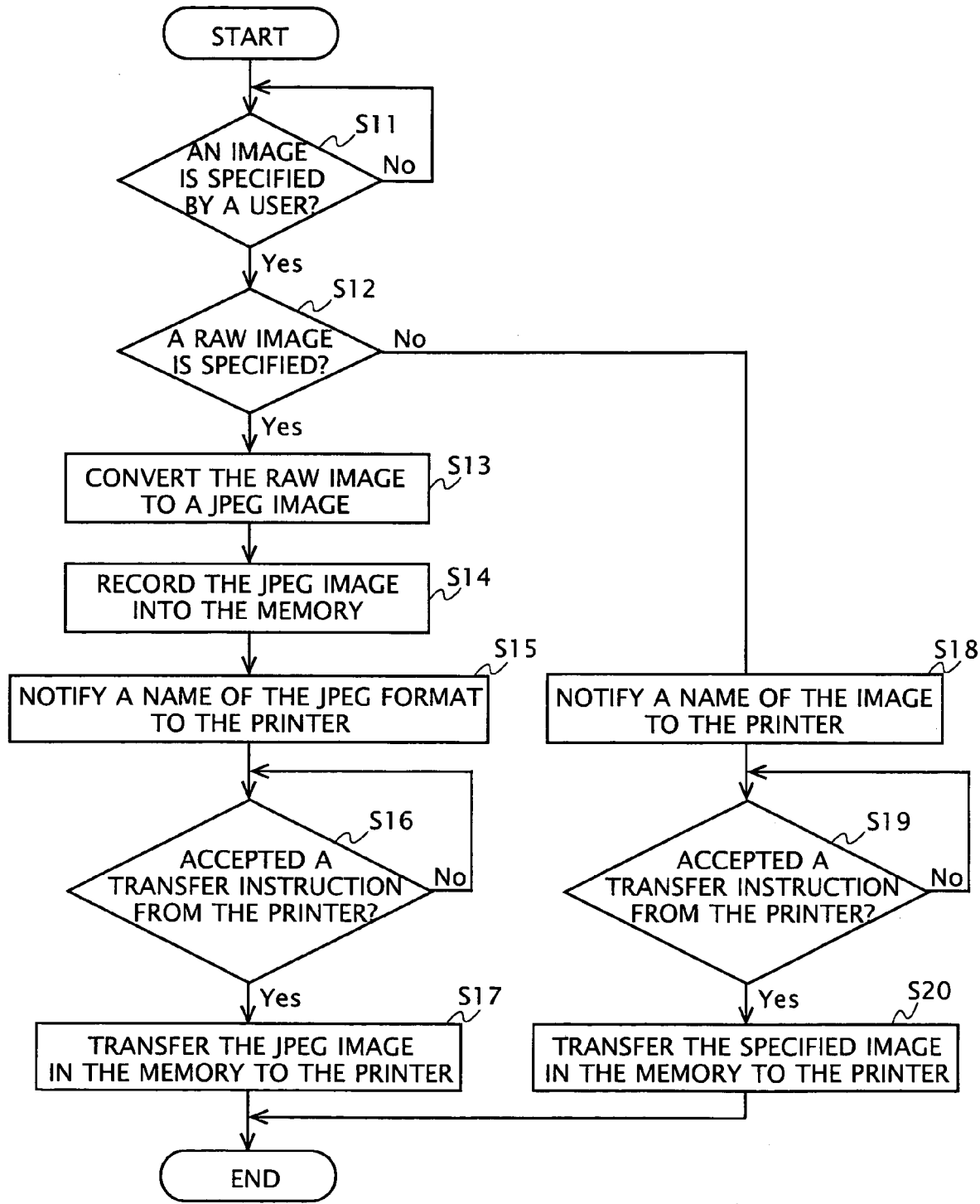

[Fig.4]
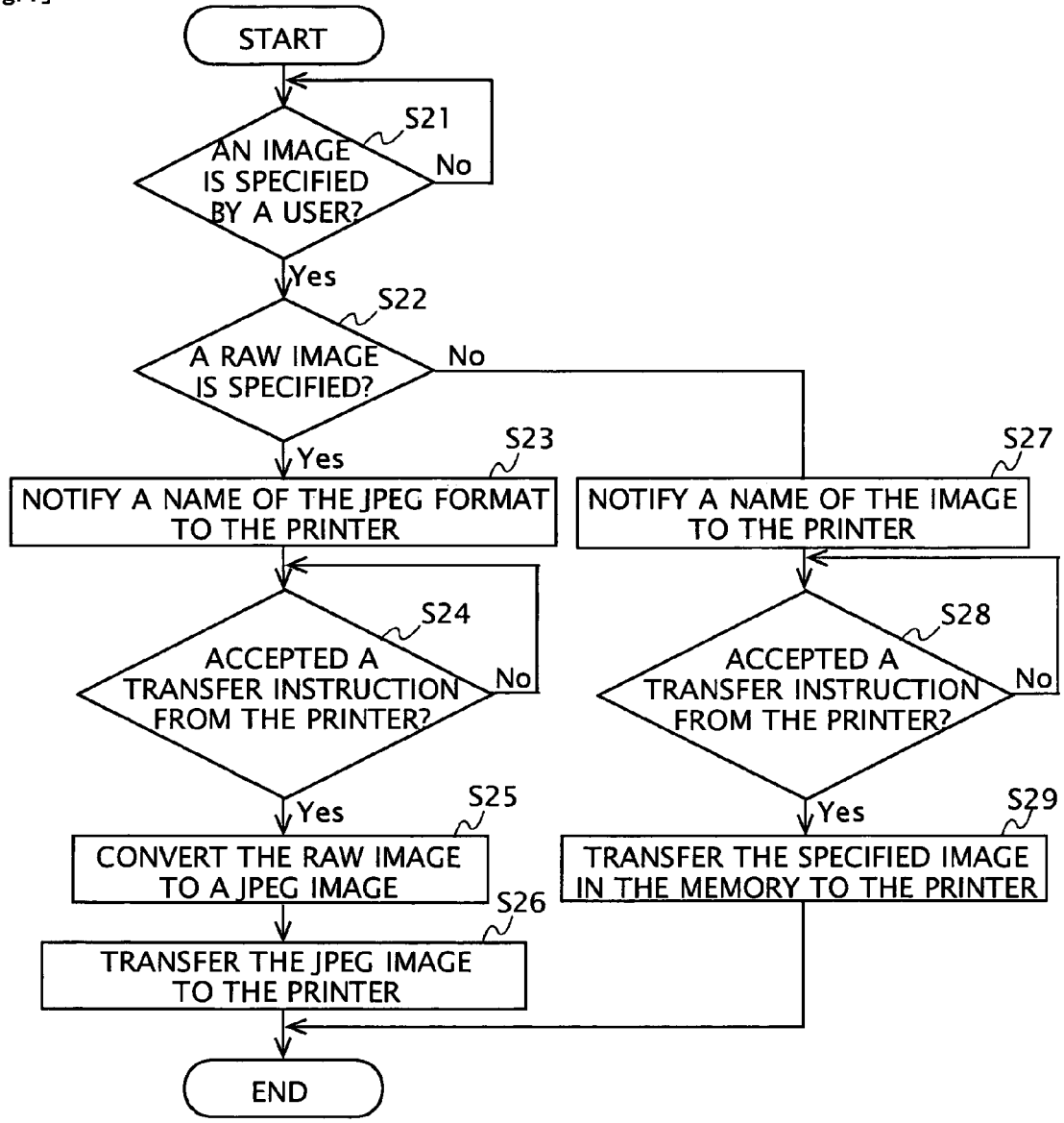
[Fig.5]
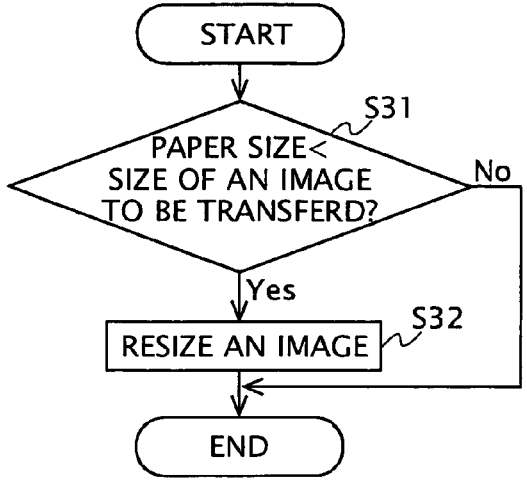

IMAGE PROCESSING SYSTEM AND ELECTRONIC CAMERA

CROSS-REFERENCE TO RELATED APPLICATION

This application is a U.S. National Stage application claiming the benefit of prior filed International Application Number PCT/JP2006/313388, filed Jul. 5, 2006, in which the International Application claims a priority date of Jul. 6, 2005 based on prior filed Japanese Application Number 2005-197830 the entire contents of which are incorporated herein by reference.

TECHNICAL FIELD

The present invention relates to an image processing system made up of an electronic camera and an image output device, and to an electronic camera.

BACKGROUND ART

A technology of connecting an electronic camera directly to an image output device such as a printer or a display without through a computer or the like to perform image output has been considered. By such a technology, user's operations can be simplified. For example, in the invention of patent document 1, an electronic camera is connected directly to a printer to perform image output. In this invention, a lossy compressed image is transferred from an electronic camera to a printer, and the image is decompressed and output by the printer.

Patent Document 1: Japanese Unexamined Patent Application Publication No. 2002-73289

DISCLOSURE

Problems to be Solved

However, in an electronic camera, an image referred to as so-called raw data which is a lossless compressed image is produced in addition to a lossy compressed image of a JPEG format or the like. The raw data has its own format depending on the manufacturer, type, or the like of the electronic camera, so that there are many cases that this image can not be decompressed by a printer. Thus, in order to output such an image, it is necessary that the image is once transferred from the electronic camera to equipment having a secondary processing function such as a computer, and is transferred to a printer after the secondary processing.

The present invention aims to shorten the processing time and improve the operability in an image processing system made up of an electronic camera and an image output device, and an electronic camera.

Means for Solving the Problems

The image processing system of the present invention is an image processing system including an electronic camera and an image output device in which the electronic camera includes an image pickup unit capturing an object image by an image sensor and outputting raw data of a digital format, a recording unit recording the raw data output by the image pickup unit, a conversion unit reading the raw data from the recording unit to convert the raw data to a data format which can be handled by the image output device, and a transfer unit transferring the raw data, the data format of which has been converted by the conversion unit, and in which the image output device includes a receiving unit receiving the raw data transferred by the transfer unit, an image processing unit performing image processing for output on the raw data received by the receiving unit, and an image output unit outputting the raw data on which image processing has been performed by the image processing unit as an image.

It is preferable that the conversion unit may convert the raw data to a JPEG format.

It is also preferable that the image processing system may further include a first accepting unit accepting a user's operation which specifies any raw data of the raw data recorded in the recording unit, and a second accepting unit accepting an instruction of transferring the any raw data from the electronic camera to the image output device, in which the conversion unit converts the raw data, when the first accepting unit accepts the user's operation, to a data format which can be handled by the image output device before acceptance by the second accepting unit.

It is also preferable that the image processing system may further include an accepting unit accepting an instruction of transferring the raw data from the electronic camera to the image output device, in which the conversion unit converts the raw data, when the accepting unit accepts the instruction, to a data format which can be handled by the image output device.

It is also preferable that the conversion unit may convert the raw data to a data format which can be handled by the image output device and performs resizing processing based on an image size suitable for output by the image output unit.

Configuration represented by converting the above configurations related to the present invention to an electronic camera including an image pickup unit capturing an object image by an image sensor and outputting raw data of a digital format is also effective as a concrete embodiment of the present invention.

Effect

According to the image processing system and the electronic camera of the present invention, the processing time can be shortened and the operability can be improved.

BRIEF DESCRIPTION OF THE DRAWINGS

FIG. 1 is a functional block diagram showing the configuration of an image processing system 1;

FIG. 2 is a flow chart showing the operation of the image processing system 1 of a first embodiment;

FIG. 3 is a flow chart showing the operation of the image processing system 1 of a second embodiment;

FIG. 4 is a flow chart showing the operation of the image processing system 1 of a third embodiment; and FIG. 5 is a flow chart showing an operation for additional processing.

DETAILED DESCRIPTION OF THE EMBODIMENTS

First Embodiment

A first embodiment of the present invention will be described in detail below based on the figures.

In the first embodiment, a printer is used as an example of the image output device of the present invention.

FIG. 1 is a functional block diagram showing the configuration of an image processing system 1.

The image processing system 1 made up of an electronic camera 10 and a printer 20 as shown in FIG. 1. The electronic camera 10 includes an image pickup unit 11 having a shooting lens, an image sensor, a CCD, and the like which are not shown in the figure, an image processing unit 12 performing image processing on an image produced by the image pickup unit 11, a display unit 13 having a liquid crystal monitor and the like for displaying an image, a recording unit 14 having a recording medium for recording images, an external interface unit 15 which can be connected to external equipment such as a computer and a printer, a control unit 16 controlling the respective units, and an operation unit 17 having a release button and the like which are not shown in the figure and accepting a user's operation. The image pickup unit 11, the image processing unit 12, the recording unit 14, the external interface unit 15, and the control unit 16 are mutually connected through a bus. Furthermore, the output of the control unit 16 is also connected to the display unit 13 through the bus. Furthermore, the output of the operation unit 17 is connected to the control unit 16.

The image pickup unit 11 performs photoelectric conversion of an object image obtained through the shooting lens by the CCD and then performs A/D conversion of the image to output raw data. The image processing unit 12 performs processing such as white balance adjustment, color processing, and gamma processing for an image produced by the image pickup unit 11, and performs data format modification and resizing processing which are features of the present invention for the image. The display unit 13 displays an image produced by the image pickup unit 11 or an image recorded in the recording unit 14 and displays a through image for composition check, thereby being used also as a finder. The control unit 16 has a memory 18 inside it to record a program for controlling the units in advance, and controls the units according to the program. Furthermore, the control unit 16 detects the state of the operation unit 17.

The printer 20 includes an external interface unit 21 which can be connected to external equipment such as a computer and an electronic camera, an image processing unit 22 performing image processing of outputting an image obtained through the external interface unit 21, an image output unit 23 printing the image on a paper, and a control unit 24 controlling the units, which are mutually connected through a bus. Image processing performed by the image processing unit 22 is, for example, JPEG decompression processing and the like.

In the electronic camera 1 configured as described above, when image capturing is instructed by the operation unit 17, the control unit 16 detects this instruction, performs photoelectric conversion of an object image obtained through the shooting lens of the image pickup unit 11 by the CCD, and then performs A/D conversion of the image to output raw data. Then, the control unit 16 performs processing such as white balance adjustment, color processing, and gamma processing through the image processing unit 12 for image data, and records the image data obtained by the processing into the recording unit 14. A data format employed when image data is recorded at this time is either raw data or a JPEG format. Selection of a data format is carried out by a user's operation through the operation unit 17. When raw data is selected, the control unit 16 records image data, for which processing such as white balance adjustment, color processing, and gamma processing has been performed by the image processing unit 12, into the recording unit 14 as it is, while when a JPEG format is selected, the control unit 16 records image data, for which JPEG compression processing has been performed after processing such as white balance adjustment, color processing, and gamma processing, into the recording unit 14.

Operations in the case that the external interface unit 15 of the electronic camera 10 is connected to the external interface unit 21 of the printer 20 by a user in the state that two or more images produced by image capturing have been recorded in the recording unit 14 will be described below. The case that the external interface unit 15 of the electronic camera 10 is connected to the external interface unit 21 of the printer 20 by a user is the case of performing so-called direct print, in which the user connects the electronic camera 10 directly to the printer 20 to perform image output. Only processing related to data transfer from the electronic camera 10 to the printer 20 which is a feature of the present invention will be described below. Processing performed after data transfer is performed similar to a publicly known technique.

When the electronic camera 10 is connected directly to the printer 20 and an image which becomes a subject of direct print is specified through the operation unit 17, the control unit 16 determines, at step S1, whether or not a raw image is specified as a subject of direct print. When a raw image is specified, the control unit 16 proceeds to step S2, while when a raw image is not specified, in other words, when a JPEG image is specified, the control unit proceeds to step S3.

At step S2, the control unit 16 reads a raw image specified as a subject of direct print from the recording unit 14, and converts the raw image to a JPEG image by performing JPEG decompression processing through the image processing unit 12.

At step S3, the control unit 16 reads the JPEG image specified as a subject of direct print from the recording unit 14 to transfer it to the printer 20, or transfers the JPEG image obtained by the conversion at step S2 to the printer 20.

As described above, according to the first embodiment, the electronic camera 10 records raw data of a digital format produced by it and converts the raw data to a data format (JPEG format) which can be handled by the image output device to transfer it to the image output device. Then, the image output device receives raw data obtained after the data format conversion, which has been transferred from the electronic camera, performs image processing for output of the raw data, and then output the raw data as an image. For this reason, also when a raw image of the electronic camera's own format is specified by a user, the electronic camera 10 converts the raw image to a JPEG format which is a data format being able to be handled by the printer 20 by using the function of the image processing unit 12 provided in the electronic camera 10. Thus, the operability of the image processing system made up of the electronic camera and the image output device can be improved. Furthermore, the electronic camera 10 converts a raw image to a JPEG format and transfers it to the printer 20, so that it can be also expected to shorten the time required for data transfer.

Second Embodiment

The second embodiment of the present invention will be described in detail below. The second embodiment is a more detail embodiment than the first embodiment.

Only the portions which are different from the first embodiment will be described below. The image processing system of the second embodiment has a configuration similar to the image processing system of the first embodiment. The second embodiment will be described below using reference symbols similar to those of the first embodiment.

In the second embodiment, a two-step instruction is performed on the occasion of direct print similar to that of the first embodiment. A first step instruction is to specify an image which becomes a subject of direct print based on a user's operation through the operation unit 17, and a second step instruction is a transfer instruction from the printer 20 to the electronic camera 10. The transfer instruction is given from the control unit 24 of the printer 20 to the control unit 16 of the electronic camera 10 in the state that the electronic camera 10 is able to transfer an image to the printer 20 which is ready to receive an image.

When the electronic camera 10 is connected directly to the printer 20, the control unit 16 determines, at step S11, whether or not an image becoming a subject of direct print is specified by a user through the operation unit 17. The control unit 16 stands by until an image is specified, and proceeds to step S12 when an image is specified.

At step S12, the control unit 16 determines whether or not a raw image is specified as a subject of direct print. When a raw image is specified, the control unit 16 proceeds to step S13, while when a raw image is not specified, in other words, when a JPEG image is specified, the control unit 16 proceeds to step S18.

At step S13, the control unit 16 reads a raw image specified as a subject of direct print from the recording unit 14, and converts it to a JPEG image by performing JPEG decompression processing through the image processing unit 12.

At step S14, the control unit 16 records the JPEG image obtained by the conversion at step S13 into the memory 18. In other words, the raw image specified at step S11 is prepared in the memory 18 as a virtual file of a JPEG format.

At step S15, the control unit 16 notifies a name of the JPEG format to the control unit 24 of the printer 20 through the external interface units 15 and 21. Since the name of the JPEG format is notified like this, a raw image which can not be handled conventionally by the printer 20 can be notified as an image which can be handled by the printer 20.

At step S16, the control unit 16 determines whether or not it has accepted a transfer instruction from the printer 20. The control unit 16 stands by until accepting the transfer instruction, and proceeds to step S17 when accepting the transfer instruction. An upper limit of the stand-by time may be provided to return to step S11 when the stand-by time exceeds the upper limit.

At step S17, the control unit 16 transfers the JPEG image (virtual file of a JPEG format) recorded in the memory 18 to the printer 20 through the external interface units 15 and 21, and then finishes the series of processing.

On the other hand, when a JPEG image is specified at step S12, the control unit 16 notifies, at step S18, a name of the image to the control unit 24 of the printer 20 through the external interface units 15 and 21.

At step S19, the control unit 16 determines whether or not it has accepted a transfer instruction from the printer 20. The control unit 16 stands by until accepting the transfer instruction, and proceeds to step S20 when accepting the transfer instruction. As with step S16, an upper limit of the stand-by time may be provided to return to step S11 when the stand-by time exceeds the upper limit.

At step S20, the control unit 16 reads the JPEG image specified at step S11 from the recording unit 14, transfers it to the printer 20 through the external interface units 15 and 21, and then finishes the series of processing.

As described above, according to the second embodiment, when a user's operation specifying any raw data of raw data recorded in the electronic camera is accepted, the any raw data is converted to a data format which can be handled by the image output device, before accepting an instruction of transferring the raw data from the electronic camera to the image output device. Thus, a raw image specified by a user's operation is prepared in the memory 18 as a virtual file of a JPEG format, so that a quick response to a transfer instruction from the printer 20 is possible.

Third Embodiment

The third embodiment of the present invention will be described in detail below. The third embodiment is a more detail embodiment than the first embodiment as with the second embodiment.

Only the portions which are different from the first embodiment will be described below. The image processing system of the third embodiment has a configuration similar to the image processing system 1 of the first embodiment. The third embodiment will be described below using reference symbols similar to those of the first embodiment.

In the third embodiment, a two-step instruction is performed, as with the second embodiment, on the occasion of direct print similar to that of the first embodiment. A first step instruction is to specify an image which becomes a subject of direct print based on a user's operation through the operation unit 17, and a second step instruction is a transfer instruction from the printer 20 to the electronic camera 10. The transfer instruction is given from the control unit 24 of the printer 20 to the control unit 16 of the electronic camera 10 in the state that the electronic camera 10 is able to transfer an image to the printer 20 which is ready to receive an image.

When the electronic camera 10 is connected directly to the printer 20, the control unit 16 determines, at step S21, whether or not an image becoming a subject of direct print is specified by a user through the operation unit 17. The control unit 16 stands by until an image is specified, and proceeds to step S22 when an image is specified.

At step S22, the control unit 16 determines whether or not a raw image is specified as a subject of direct print. When a raw image is specified, the control unit 16 proceeds to step S23, while when a raw image is not specified, in other words, when a JPEG image is specified, the control unit 16 proceeds to step S27.

At step S23, the control unit 16 gives a name of a JPEG format to the raw image, and notices the name to the control unit 24 of the printer 20 through the external interface units 15 and 21. Since the name of a JPEG format is notified like this, a raw image which can not be handled conventionally by the printer 20 can be notified as an image which can be handled by the printer 20.

At step S24, the control unit 16 determines whether or not it has accepted a transfer instruction from the printer 20. The control unit 16 stands by until accepting the transfer instruction, and proceeds to step S17 when accepting the transfer instruction. An upper limit of the stand-by time may be provided to return to step S21 when the stand-by time exceeds the upper limit.

At step S25, the control unit 16 reads the raw image specified at step S21 from the recording unit 14, and converts it to a JPEG image by performing JPEG decompression processing through the image processing unit 12.

At step S26, the control unit 16 transfers the JPEG image obtained by the conversion at step S25 to the printer 20 through the external interface units 15 and 21, and then finishes the series of processing.

On the other hand, when a JPEG image is specified at step S22, the control unit 16 notifies, at step S27, a name of the image to the control unit 24 of the printer 20 through the external interface units 15 and 21.

At step S28, the control unit 16 determines whether or not it has accepted a transfer instruction from the printer 20. The control unit 16 stands by until accepting the transfer instruction, and proceeds to step S20 when accepting the transfer instruction. As with step S24, an upper limit of the stand-by time may be provided to return to step S21 when the stand-by time exceeds the upper limit.

At step S29, the control unit 16 reads the JPEG image specified at step S21 from the recording unit 14, transfers it to the printer 20 through the external interface units 15 and 21, and then finishes the series of processing.

As described above, according to the third embodiment, when accepting an instruction of transferring raw data from the electronic camera to the image output device, the electronic camera converts the raw data to a data formation which can be handled by the image output device. For this reason, when receiving a transfer instruction in the case that a raw image of the electronic camera's own format is specified by a user, the electronic camera converts the raw image to a JPEG format which is a data format being able to be handled by the printer 20 by using the function of the image processing unit 12 provided in the camera 10. Thus, the electronic camera 10 may convert a raw image to a JPEG format only when necessary.

Before the transfer processing of the first, second, or third embodiment described above, the following processing may be added. The transfer processing of the first embodiment is performed at step S3 of the flow chart in FIG. 2, the transfer processing of the second embodiment is performed at step S17 or S20 of the flow chart in FIG. 3, and the transfer processing of the third embodiment is performed at step S26 or S29 of the flow chart in FIG. 4.

At step S31, the control unit 16 determines whether or not the size of an image to be transferred is larger than a paper size. Here, a paper size is the size of a paper on which the image output unit 23 of the printer 20 prints an image, and is, for example, A4 size, A5 size, or the like. The paper size is specified by a user's operation through the operation unit 17. The control unit 16 proceeds to step S32 when the size of an image to be transferred is larger than the paper size, while it performs the transfer processing when the size of an image to be transferred is smaller than the paper size.

At step S32, the control unit 16 resizes an image to be transferred in agreement with the paper size, and then performs the transfer processing.

When one image is output to a paper of A4 paper size for example, the size of the image can be the order of 5 M bytes sufficiently. Furthermore, when two images are output to a paper of A4 paper size, or when one image is output to a paper of A5 paper size (L size), the size of the image can be the order of 3 M bytes sufficiently. The control unit 16 records an image size suitable for each of paper sizes as a table in advance, and performs resizing processing through the image processing unit 12 before the transfer processing.

As described above, raw data is converted to a data format which can be handled by the image output device, and resizing processing is performed based on an image size suitable for output, so that it can be prevented that wasted transfer time arises by transferring an image having a size larger than necessary. In addition, there are many cases that the electronic camera is not operated during the operation of the printer, so that the performance balance between the electronic camera and the printer is bad. For this reason, the electronic camera performs resizing processing during the operation of the printer, thereby improving the performance balance and also increasing the total throughput.

Such resizing processing may be performed regardless of the format of an image to be transferred. When an image to be transferred is a raw image, it can be expected to significantly shorten the transfer time by reducing the size of the data as far as possible. In the embodiments described above, a printer is described as an example of the image output device. However, the present invention can be similarly applied to an image output device such as a display device or a projector.

Furthermore, in the embodiments described above, a JPEG format is described as an example of a data format which can be handled by the image output device. However, other formats such as TIFF formats and BMP formats may be used provided that they can be handled by the image output device.

Furthermore, in the embodiments described above, an example of accepting a user's operation through the operation unit 17 of the electronic camera 10 is shown. However, an operation unit may be provided in the printer 20 to accept a user's operation through the operation unit as appropriate.

Furthermore, the embodiments described above may be implemented in combination therewith. For example, a mode of performing the processing described in the second embodiment and a mode of performing the processing described in the third embodiment may be provided to implement either of the processing of the second embodiment and the processing of the third embodiment according to a user's operation.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An image processing system comprising an electronic camera and an image output device, wherein said electronic camera includes:
　　an image pickup unit capturing an object image by an image sensor and outputting raw data of a digital format;
　　a recording unit recording said raw data output by said image pickup unit;
　　a first accepting unit accepting a user's operation which specifies any raw data of said raw data recorded in said recording unit;
　　a second accepting unit accepting an instruction from said image output device to transfer said any raw data being specified from said electronic camera to said image output device;
　　a conversion unit reading said raw data from said recording unit after said first accepting unit accepts said user's operation to convert said raw data to a data format which can be handled by said image output device, wherein said recording unit does not record said raw data, the data format of which has been converted by said conversion unit; and
　　a transfer unit transferring said raw data, the data format of which has been converted by said conversion unit to said image output device in accordance with acceptance of said instruction by said second accepting unit, and
　　a naming unit giving said raw data a name consistent with the data format which can be handled by said image output device before said raw data is converted to the data format which can be handled by said image output device,
　　wherein said image output device includes:

a receiving unit receiving said raw data transferred by said transfer unit, an image processing unit performing image processing for output on said raw data received by said receiving unit; and an image output unit outputting said raw data on which image processing has been performed by said image processing unit as an image.

2. The image processing system according to claim 1, wherein said conversion unit converts said raw data to a JPEG format.

3. The image processing system according to claim 1, wherein said conversion unit converts said raw data to a data format which can be handled by said image output device and performs resizing processing based on an image size suitable for output by said image output unit.

4. The image processing system according to claim 1, wherein said transfer unit transfers the name to said receiving unit before said raw data is converted to the data format which can be handled by said image output device.

5. An electronic camera comprising:

an image pickup unit capturing an object image by an image sensor and outputting raw data of a digital format;

a recording unit recording said raw data output by said image pickup unit;

a transfer unit transferring information recorded in said recording unit to an external image output device;

a first accepting unit accepting a user's operation which specifies any raw data of said raw data recorded in said recording unit;

a second accepting unit accepting an instruction from said external device to transfer said any raw data from said electronic camera to said external image output device; and a conversion unit reading said raw data from said recording unit after said first accepting unit accepts said user's operation to convert said raw data to a data format which can be handled by said image output device, a naming unit giving said raw data a name consistent with the data format which can be handled by said external image output device before said raw data is converted to the data format which can be handled by said external image output device, wherein said recording unit does not record said raw data, the data format of which has been converted by said conversion unit, and said transfer unit transfer said raw data, the data format of which has been converted by said conversion unit to said image output device in accordance with acceptance of said instruction by said second accepting unit.

6. The electronic camera according to claim 5, wherein said conversion unit converts said raw data to a JPEG format.

7. The electronic camera according to claim 5, wherein said conversion unit converts said raw data to a data format which can be handled by said image output device and performs resizing processing based on an image size suitable for output by said image output device.

8. The electronic camera according to claim 5, wherein said transfer unit transfers the name to said external image output device before said raw data is converted to the data format which can be handled by said external image output device.

* * * * *